INVENTOR
Leon Berman
By Paul M. Craig, Jr.
ATTORNEY

INVENTOR
Leon Berman
By Paul M. Craig, Jr.
ATTORNEY

Jan. 27, 1970 L. BERMAN 3,492,580

SUPPRESSED CARRIER VESTIGIAL-SIDEBAND COMMUNICATION SYSTEM

Filed May 5, 1966 4 Sheets-Sheet 3

INVENTOR
Leon Berman
By Paul M. Craig, Jr.
ATTORNEY

SUPPRESSED CARRIER VESTIGIAL-SIDEBAND COMMUNICATION SYSTEM

INVENTOR
Leon Berman
By Paul M. Craig, Jr.
ATTORNEY

United States Patent Office 3,492,580

Patented Jan. 27, 1970

3,492,580

SUPPRESSED CARRIER VESTIGIAL-SIDEBAND COMMUNICATION SYSTEM

Leon Berman, Asnieres, France, assignor to C.I.T.-Compagnie Industrielle des Telecommunications, Paris, France, a French corporation Filed May 5, 1966, Ser. No. 548,004
Claims priority, application France, May 5, 1965, 15,922; Oct. 1, 1965, 33,464
Int. Cl. H04b 1/68
U.S. Cl. 325—49 7 Claims

ABSTRACT OF THE DISCLOSURE

Single-side-band communication system wherein transmission includes transposition of a portion of the suppressed side band to a position on the opposite side of the carrier frequency adjacent the retained sideboard for effecting carrier retrieval and reception which effects such retrieval through re-transposition of said portion and detection.

This invention relates to a new and improved single-side-band communication system.

More particularly, the invention relates to novel transmit and receive circuit arrangements capable of furnishing a pure reference carrier frequency necessary for the correct demodulation of a low frequency information signal for use in a communication system employing short waves and single-side-band transmission techniques. In using single-side-band transmission techniques, it is necessary that the carrier of the single-side-band transmitter and the carrier used at the receiver for demodulation not deviate from an authorized maximum allowable value. This maximum allowable frequency deviation varies between a few hertz and several tens of hertz (45 hertz for the North Atlantic Treaty Organization "NATO" specifications, or 22.5 hertz for each hookup in relation to the assigned frequency). At 45 mHz., a 22.5 Hz. maximum deviation requires a $5\times10^{-7}$ stability. If single side-band operation is extended to VHF and UHF bands, the required stability reaches $5\times10^{-8}$ at 450 mHz.

In single-side-band communication systems, direct setting-up, decimal controlled, frequency synthesizers have made much progress. For example, it is relatively easy to set up mobile communications equipment on airplanes, with synthesizers having a $1\times10^{-6}$ stability. But, the "$10^{-8}$" steps is not actually industrially available for mobile equipment, which is why the known commercially available synthesizers hold to a few tens of megahertz and to the scale of frequencies available for use with single-side-band communications (S.S.B.). Nevertheless, it is desirable to extend the S.S.B operation to the scales of metric and decimetric waves (VHF and UHF).

There is a known method to get around the difficulty described above. This method employs the transmission of a residual carrier by the transmitter at a relatively low power level. This solution, apparently satisfactory, actually has prohibitive inconveniences at least in some important applications:

(1) Even at a low power level, the transmission of the residual carrier constitutes a considerable energy expense. But, the saving of several decibels in airplane equipment can have a compensating advantage.

(2) The emission of a carrier even at low levels can enable an enemy radiogoniometer to find the transmitter, while a S.S.B. emission spectrum escapes present radiogoniometers.

(3) In case of selective "fading" affecting the carrier, the low level residual carrier is no longer received and all information is lost, demodulation at the receiver being impossible.

(4) In communication with rapily moving bodies (supersonic airplanes) the existence of the Doppler-Fizeau effect causes in certain cases an annulling deviation: Calculations show that this deviation is a relative value around $10^{-6}$ per "Mach" unit. For 30 mHz. and Mach 3, this deviation is 90 Hz. hence, the admissible tolerance (45 hertz for NATO equipment) is greatly exceeded, and communication is impossible.

To mitigate these difficulties, the invention provides a single-side-band communications system wherein a narrow auxiliary lateral band is transmitted along with the principal information bearing band for subsequent use at the receiver for demodulation of the information signal. In this system reception comprises: a first demodulation by a first carrier capable of having a considerable error $\Delta f$; a second demodulation by a second carrier with the same error $\Delta f$. These furnish, by difference demodulation a final reference carrier frequency used in demodulation of the low frequency information signal, and which is strictly without error. This final reference carrier is furnished, following the first and second demodulations, by the addition of two narrow spectra situated on either side of the theoretical position of the reference carrier frequency followed by a division by two.

According to another characteristic of the invention, in the single-side-band signal emitted by the transmitter, a narrow auxiliary lateral band (for example from 200 to 300 Hz.), situated on one side of the reference carrier frequency position, is transmitted along with the principal lateral band containing the information signal, situated on the other side of the reference carrier position. In preferred embodiments of the invention, this precited auxiliary lateral band is situated at a distance from the reference carrier frequency on the order of 400 to 500 Hz. and has a width on the order of 200 to 300 Hz.

A still further feature of the invention is the provision of an S.S.B. communications receiver that comprises a primary demodulator and a second demodulator, a first bandpass filter, a second bandpass filter, a mixer furnishing the spectrum sum of two spectra issued from said filters, followed by a frequency divider that divides the frequency by 2, and a last demodulator. To one input of the last demodulator is applied the principal information bearing lateral band, separated by a bandpass filter at the output of the primary demodulator, and the other input receives the signal from the said frequency divider.

Other characteristics of the invention will appear in the following detailed description of two particular examples of the present invention, when considered in connection with the attached drawings, wherein.

According to a first system for practicing the invention to achieve communication with metric waves, the transmission modulation is made in three steps, and the reception demodulation is made in three steps. To accomplish this, the receiver comprises a primary demodulator and a secondary demodulator which are followed by a last demodulator.

Figure 1:
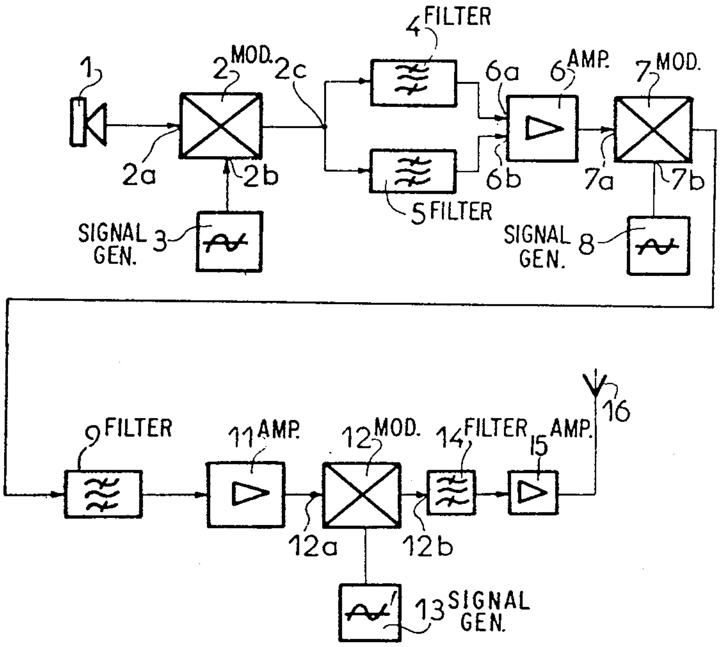
FIGURE 1 is a schematic block diagram of a single-side-band transmitter suitable for use in a communications system constructed according to the invention.

In FIGURE 1, a transmitter for a single-side-band communication system according to the invention, is shown, and comprises a first modulator 2 which is fed at *2a* by current coming from a low frequency information entrance stage 1, and at *2b* by a fixed frequency of 250.8 kHz. furnished by an oscillator 3. This entrance stage for the low frequency information current in a band on the order of 300–3000 Hz. can be, for example, a voice frequency microphone and current amplifier. The output terminal *2c* of the modulator 2 is connected on one side to a first bandpass filter 4 having a 250.3–250.5 kHz. bandpass and on the other side to a second bandpass filter 5 having a 251.1–253.8 kHz. bandpass. The output currents of these two filters are respectively applied to the two inputs *6a* and *6b* of a mixing amplifier 6 and the combined spectrum obtained at the output is applied to one input *7a* of a modulator 7. Modulator 7 has another input *7b* that receives a 900 kHz. current furnished by an oscillator 8 and serves to hetrodyne or beat these two signals and produce at its output the resultant composite frequencies. The terminal of the output *7c* of the modulator 7 could feed two parallel amplifiers which would have a bandpass for 1150.3–1150.5 kHz., and a bandpass for 1151.1–1153.8 kHz., however, advantageously, such amplifiers can be replaced by a single bandpass filter such as 9 and single amplifier. Therefore, the output currents of the bandpass filter 9 are supplied through an amplifier 11, whose output feeds an input *12a* of a modulator 12. The modulator 12 has another input *12b* which receives a 20 mHz. carrier furnished by an oscillator, for example, a frequency synthesizer 13. The resultant modulated carrier is then supplied through an output bandpass filter 14, an amplifier 15, which amplifies current in the (21150.3–21150.5) kHz. and (21151.1–21153.8) kHz. bands, and feeds a transmitting antenna 16.

Figure 2:
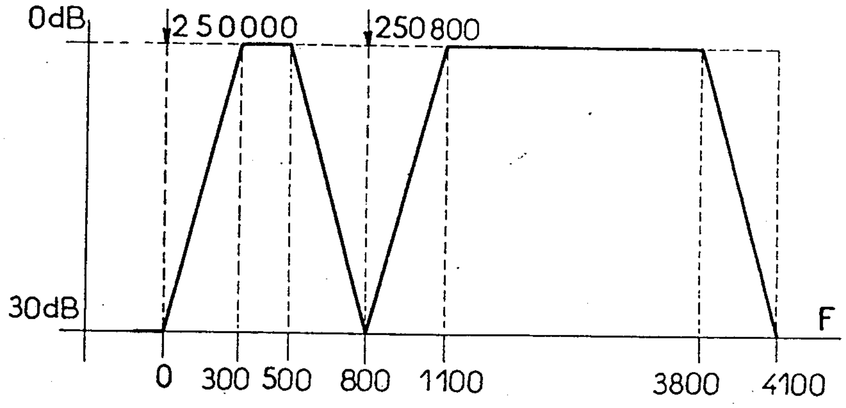
FIGURE 2 represents the frequency spectrum at a certain point of the circuit in FIGURE 1.

FIGURE 2 shows the frequency spectrum of the current at the input *7a* of the modulator 7 placing in evidence the narrow auxiliary lateral 250.3–250.500 kHz. band and the principal wide lateral band 251.1–253.8 kHz. transporting the low frequency information signal.

Figure 3:
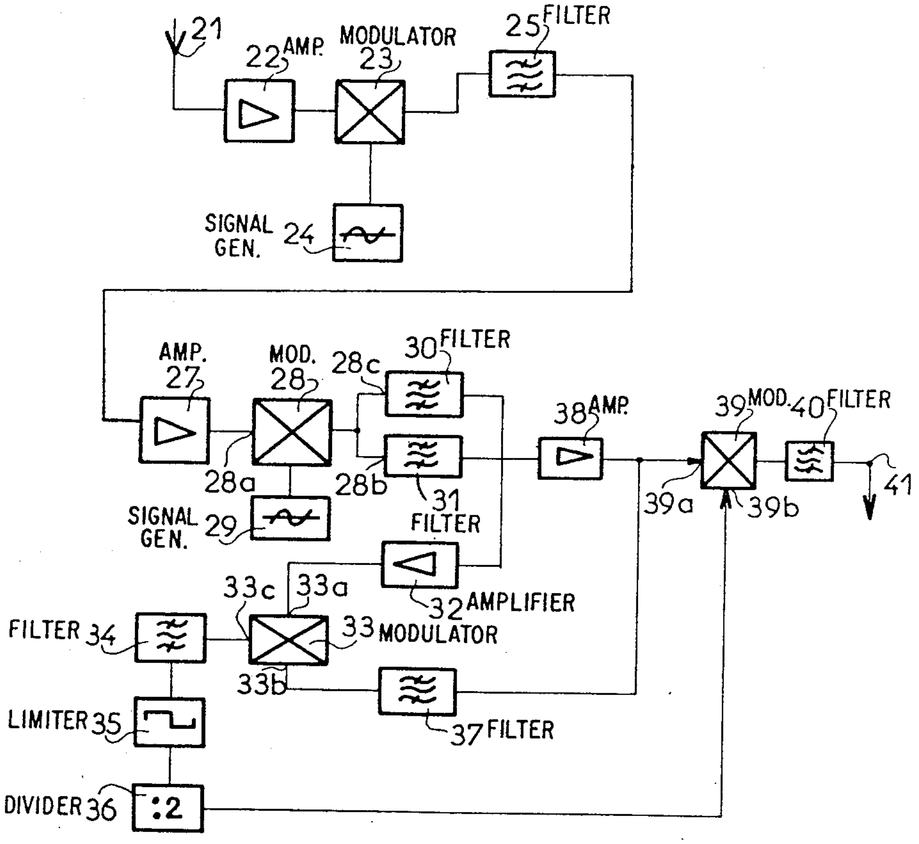
FIGURE 3 is a schematic representation of a single-side-band receiver suitable for use with the transmitter of FIGURE 1 in a system according to the invention.

FIGURE 3 illustrates one embodiment of a receiver suitable for use with the preceding transmitter in a single-side-band communication system. A reception antenna 21 excites a high frequency amplifier 22, which feeds the input of a first or primary demodulator 23. First demodulator 23 has another input fed by a frequency synthesizer 24, which generally will furnish a frequency slightly different from 20 mHz., or 20 mHz.—$\epsilon$. The output from demodulator 23 is supplied through a conventional bandpass filter 25 that separates a $(1150.3+\epsilon)-(1153.8+\epsilon)$ kHz. band and supplies this lower frequency signal to the input of a mixing amplifier 27. A second demodulator 28 receives on one side the output current of the amplifier 27 and on the other side a 900 kHz. current furnished by an oscillator 29. The output *28c* of the second demodulator 28 feeds two parallel filters 30 and 31.

The first filter 30 transmits currents in one $(250.3+\epsilon-250+\epsilon-253.8+\epsilon)$ kHz. band and its output is applied by means of a separating amplifier 32 to an input *33a* of a third demodulator 33. An amplifier 38 receives the output current of the filter 31 which has a bandpass of $251.1+\epsilon-253.8+\epsilon$ kHz., and applies it to the input of a third bandpass filter 37. Third bandpass filter 37 transmits currents in a $(251.1+\epsilon-251.3+\epsilon)$ kHz. band, and supplies its output to the input *33b* of third demodulator 33. Each frequency transmitted by the third demodulator 33 corresponds to a frequency modulation symmetrically placed in relation to the carrier 250.8 kHz., shifted by $\epsilon$, or $(250.8+\epsilon)$ kHz. A fourth filter 34 is fed by the output terminal *33c* of the demodulator 33, and is tuned to pass a $(501.6+2\epsilon)$ kHz. current. This frequency passes into a limiting device 35, then into divider 36 which divides the frequency by 2. From the divider 36, the half frequency of $(501.6+2\epsilon)$ kHz. or $(250.8+\epsilon)$ kHz. is extracted. This frequency corresponds to the reference carrier frequency employed at the transmitter.

A last or output demodulator 39 receives, at an input *39a*, the current output of the amplifier 38, which passes a $(251.1+\epsilon-253.8+\epsilon)$ kHz. band, containing the low frequency information signal. At a second input *39b*, the reference carrier frequency issued from the precited divider 36, or $(250.8+\epsilon)$ kHz. is supplied to output demodulator 39. The output from demodulator 39 is supplied through an output filter 40 so that the unaltered information modulation frequencies 300–3000 Hz. are found at the output terminal 41 of the receiver.

The frequency divider by 2 can be of any known type, for example, a modulator or a divider including triggers such as a multi-vibrator.

It is well understood that the above mentioned demodulation process is completely general in scope; the examples were based on precise numerical values only to facilitate the comprehension of the principle of the invention.

The advantages of the present invention over other known techniques are as follows:

(1) It receives a high frequency carrier with precision and average stability; the error thus provoked by the primary demodulation is corrected in the last demodulation.

(2) It extracts a reference carrier further used for effecting the said correction, not from a pure transmitted frequency, subject to selective fading, but from a notably large spectrum. This results in a very high probability that the carrier information will be received in every case.

(3) The carrier, being extracted from the transmitted spectrum, automatically furnishes the correction for the Doppler effect, which effects the transmitted spectrum.

In the example described above, it was supposed that the supplementary band was extracted from the spectrum of the information signal itself.

The two narrow similar bands of the carrier [here (250.3–250.5) kHz. and (251.1–251.3) kHz.] can equally be produced by the application of a supplementary low frequency spectrum, here covering (300–500) Hz., by vibrator means or in a general manner, by a low frequency signal generator covering the considered scale.

The above described device notably has the advantage that all frequency deviations between the carriers at transmission and at reception (deviation due in general to the instability of oscillators, or more particularly, to the Doppler-Fizeau effect in mobile communications between a transmitter and a receiver moving in relation to the transmitter) is strictly eliminated.

In the description above, attention was called to the oscillator 3 in FIGURE 1 and the modulator 39 in FIGURE 3 working at a 250.8 kHz. frequency. This example reflects the fact that the operation of the demodulation process with frequency deviation is as described above, but requires the use of at least one fractional non-round frequency value oscillator to produce the fractional non-round reference frequency values in kilohertz.

Such a non-round frequency value is considered inopportune in single-side-band communciations since in this technical branch, non-fractional or round frequency values are standardly used. The equipment as described above therefore is not compatible with standard equipment.

This is why, according to a variation of the present invention, a demodulation is performed with compensation of frequency deviations by means of a carrier formed from two partial spectra extracted from the transmitted band, and for this purpose, an auxiliary spectrum with a frequency of a few hundred hertz is situated on the same side of the carrier as the principal information signal spectrum, and is transmitted along with the principal low frequency information signal spectrum.

Another characteristic of the variation of the present invention is the fact that in transmission, after a first modulation which furnishes the principal spectrum on one side of the carrier and the auxiliary spectrum on the other side, a modulation of the auxiliary spectrum is performed by a relatively low frequency, actually a few kilohertz, restoring the said auxiliary spectrum to the same side as the principal spectrum. In reception, the auxiliary spectrum is restored to the other side of the carrier in relation to the principal spectrum by an opposite process.

Except for the supplementary transmission and reception modulations, the whole of the transmission process is exactly like that of the base system described above. However, according to the present variation, it is possible to utilize carriers having non-fractional round frequency values. The same is true with respect to the equipment used with and without Doppler effect compensation. This makes the equipment compatible with standard equipment.

Figure 4:
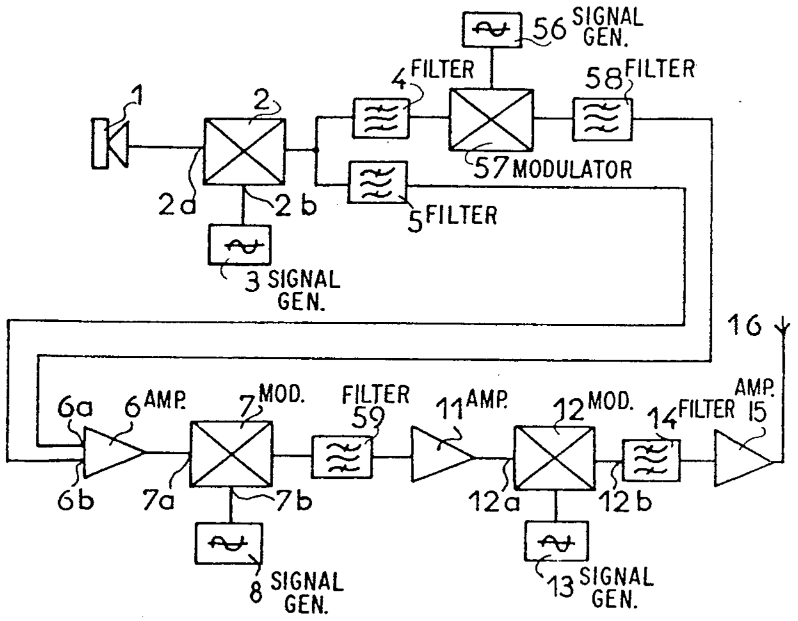
FIGURE 4 is a schematic block diagram of a second single-side-band transmitter suitable for use in a communication system in accordance with the invention.
Figure 6:
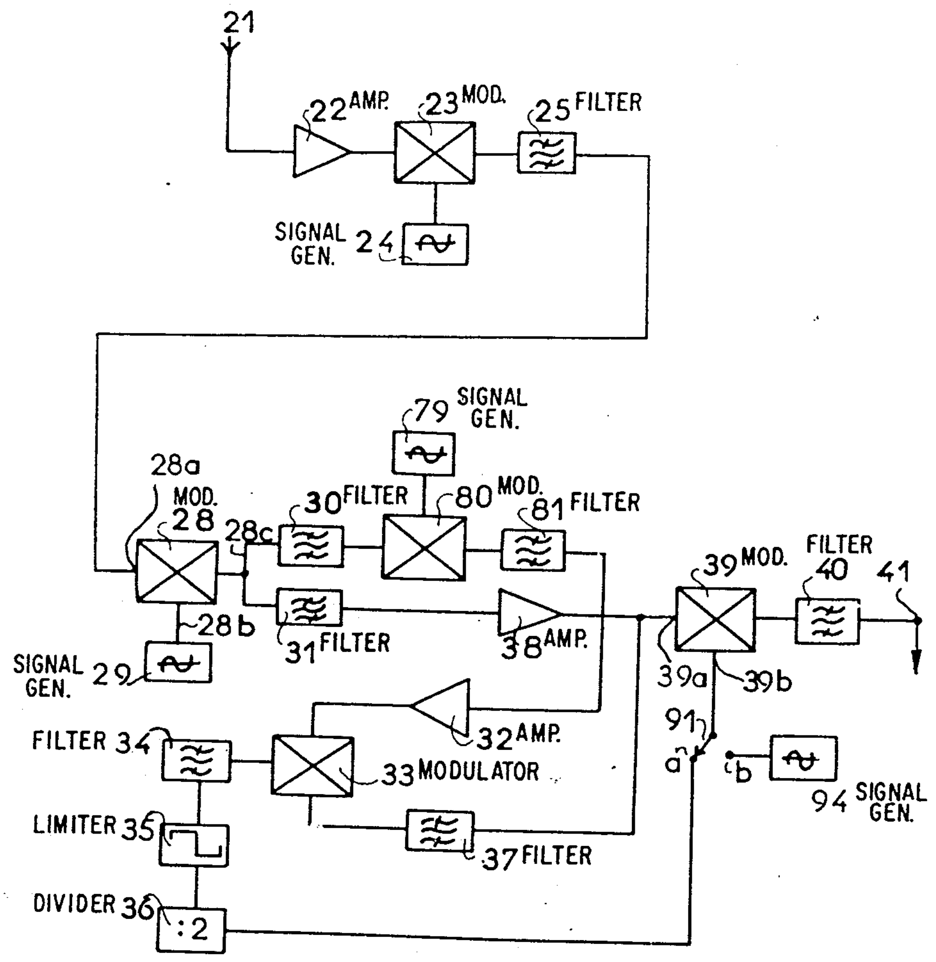
FIGURE 6 is a schematic block diagram of a single-side-band receiver suitable for use with the transmitter of FIGURE 4.

In the variation illustrated in FIGURES 4 and 6, the transmission modulation and the reception demodulation are performed in four steps.

In FIGURE 4, the transmitter comprises a low frequency information signal entrance stage 1 and a modulator 2 fed by the stage 1 and by a fixed frequency of exactly 250 kHz. furnished by an oscillator 3. The output terminal of the modulator 2 is connected to first and second bandpass filters 4 and 5 where the bandpasses are respectively 249.5–249.7 kHz. and 250.3–253 kHz. Contrary to FIGURE 1, the first filter 4 is not directly connected to the input of a mixing amplifier, but is connected instead to a modulator 57 fed on one side by the output current of the first filter 4 (249.5–249.7 kHz.) and on the other side by a 4.1 kHz. current furnished by an oscillator 56. A third bandpass filter 58 passes the 253.6–253.8 kHz. band, so that the output currents of the two filters 58 and 5 add in mixing amplifier 6. The spectrum obtained at the output of the amplifier 6, and a 900 kHz. current furnished by an oscillator 8 are applied to the input of the modulator 7. The output of modulator 7 feeds a bandpass filter 59 covering the total 1150.3–1153.8 kHz. band, and the output of filter 59 is supplied through an amplifier 11 to one input of a modulator 12. The remaining input of the modulator 12 receives a 20 mHz. current furnished by an oscillator 13. The output from modulator 12 is then supplied through an output filter 14 to an amplifier 15 which amplifies the current in the whole 21150.3–21153.8 band transmitted by the filter 14, and the resultant amplified and filtered signal is supplied to a transmitting antenna represented by reference numeral 16.

Figure 5:
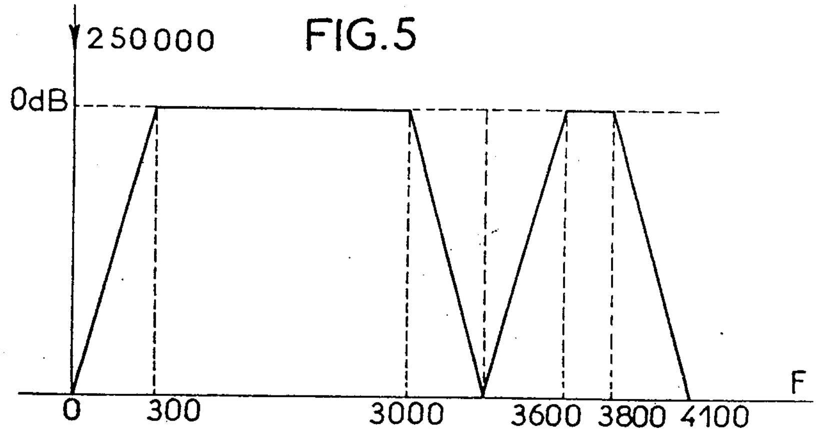
FIGURE 5 is a curve analogous to that of FIGURE 2 and represents the frequency spectrum at a certain point in the circuit of FIGURE 4.

FIGURE 5 shows the position of the bandpasses at the output of the amplifier 6. On this figure, analogous to FIGURE 2, the zero of the frequency scale corresponds to exactly 250 kHz.

FIGURE 6 shows a receiver intended for use with the transmitter of FIGURE 4 in a single-side-band communication system. In the receiver of FIGURE 6, a reception antenna 21 feeds an amplifier 22 and this amplifier, together with an oscillator 24 having a normal frequency of 20 mHz. (actually 20 mHz.$-\epsilon$), feed a first demodulator 23. The first demodulator 23 performs a transposition on the received signal to a lower frequency which is supplied through an input bandpass filter 25, passing current in the whole (1150.3–1153.8) kHz. band to an input **28*a* of a second demodulator 28. The other input 28*b* of second demodulator 28 is fed by a 900 kHz. current furnished by an oscillator 29 and the output of the demodulator 28 feeds first and second parallel filters 30 and 31**, respectively.

Second filter 31 transmits current in a 250.3$+\epsilon$ kHz.–253$+\epsilon$ kHz. band which is amplified by the amplifier 38 that is connected to an output demodulator 39 and a third bandpass filter 37. The first filter 30 transmits current in a (253.6$+\epsilon$–253.8$+\epsilon$) kHz. band which feeds the input of a third demodulator 80 having its other input fed by an oscillator 79 which furnishes a 4.1 kHz. frequency. The output of the third demodulator 80 is connected to the input of a fifth filter 81 which transmits current in a 249.5–249.7 kHz. band to an amplifier 32. The output of the amplifier 38 which feeds third bandpass filter 37, transmits a (250.3$+\epsilon$–250.5$+\epsilon$) kHz. band signal currents to a fourth demodulator 33. This current and the output current of the amplifier 32 of the (249.5$+\epsilon$–249.7$+\epsilon$) kHz. band feed fourth demodulator 33 which supplies its output to a fourth bandpass filter 34. The fourth bandpass filter 34 passes a 500$+2\epsilon$ kHz. frequency to a limiter 35 and thence to a divider 36 which divides the frequencies by 2.

The frequency extracted from the divider 36, (250$+\epsilon$) kHz., is the reference carrier frequency, and is supplied to one input of an output demodulator 39. Output demodulator 39 has its other input supplied by the current from the amplifier 38 which occupies a (250.3$+\epsilon$–253$+\epsilon$) kHz. band. Unaltered information signal modulation frequencies of 300–3000 Hz. are obtained at the output 41 through output filter 40. A commutator 91, with two positions *a*, *b*, allows the demodulator 39 to be fed either by the output current of the divider 36 (position *a*), or by the current of a high stability oscillator 94 with a 250 kHz. frequency standard (position *b*). In the "*a*" position, the carrier frequency is corrected; in the "*b*" position the functioning of the standard mode without correction is used. In closing, it should be noted equipment constructed conforming to FIGURES 4 to 6 is compatible with standard kHz. round frequency mode single-side-band communication equipment.

Because the power of the transmitter is subdivided between a principal spectrum which contains the information to be transmitted and an auxiliary spectrum, the signal/noise ratio of a single-side-band transmission modified according to the invention is a bit lower than that in standard single-side-band transmission. However, this loss is small. Calculations show that, with a standard (type A3*j*) single-side-band transmission equipment, a signal/noise ratio gain of 9 db is obtained. With amplitude modulation (type A3), the gain of a single-side-band transmission according to the invention is 8.5 db. Thus the loss is only 0.5 db, while, elsewhere, there is benefit from the correction of frequency deviation.

Having described two different embodiments of new and improved single-side-band communication systems constructed in accordance with the invention, it is believed obvious that other modifications and variations of the present invention are possible in the light of the above teachings. It is therefore to be understood that changes may be made in the particular embodiments of the invention described which are within the full intended scope of the invention as defined by the appended claims.

I claim:

1. A transmitter of the single-side-band type comprising first modulation means to modulate a first non-fractional round frequency value carrier wave with a low frequency signal current containing the information to be transmitted, first filter means to remove the carrier and extract a relatively narrow band from one side-band where one of the extremities thereof borders on the carrier, second filter means to remove the carrier and extract the other relatively wide side-band situated on the other side of the carrier in relation to the said narrow band, means connected to said first filter means to transpose the said narrow band to the other side of the limit of the said wide side-band, means for summing said wide side-band and said narrow transposed band, and output means for effecting at least one transposition to a higher frequency in the spectrum of the signal formed by the sum of the said wide side-band and the said narrow transposed band.

2. A transmitter of the single-side-band type as defined in claim 1 wherein said means to transpose said narrow band comprises second modulation means to modulate the said narrow band by an auxiliary carrier followed by additional filter means extracting only one side-band of the resulting modulated signal and summing means for summing said wide band derived from said second filter means and said narrow band derived from said additional filter means.

3. A receiver of the single-side-band type where the spectrum of the received signal wave comprises a wide band containing the information and a narrow auxiliary band destined for the reconstitution of a reference carrier, said wide and narrow bands being disposed on one side of the frequency of said reference carrier in the received spectrum, and where the frequency of the reference carrier has a non-fractional round value, comprising first demodulation means to transpose the received signal spectrum to a lower frequency, second demodulation means for demodulating the lower frequency signal spectrum with a first carrier to obtain a composite spectrum containing the said wide and narrow bands, first filter and third demodulation means to extract and transpose the said narrow auxiliary band from the composite spectrum, the said narrow auxiliary band being transposed to a frequency range entirely comprised inside the band symmetrical to the wide band with respect to the reference carrier frequency, second filter means to extract the said wide band limited by the said round value reference carrier frequency from the said composite spectrum, third filter means to extract from said wide band a narrow supplementary band symmetrical to the said transposed narrow auxiliary band in relation to the said reference carrier frequency, fourth demodulation means to demodulate the said transposed narrow auxiliary band with the said supplementary band, fourth filtering means to extract a frequency double the value of the said reference carrier frequency from the output of the fourth demodulation means, division means coupled to the output from the fourth filtering means to extract the said reference carrier, and output demodulation means to obtain the low frequency information signal comprising means coupled to the output of the second filter means to demodulate the said wide band containing the information signal with the said reference carrier derived by the division means followed by additional filtering means.

4. The receiver set forth in claim 3, wherein the first filter and third demodulation means comprises first filter means to extract the said narrow auxiliary band bordering on the reference carrier frequency from said composite spectrum appearing at the output of the second demodulation means, third demodulation means for demodulating the extracted narrow auxiliary band with a second low frequency carrier, and fifth filter means for extracting the transposed narrow auxiliary band.

5. A single-side-band communication system including in combination a transmitter of the single-side-band type comprising first transmitter modulation means to modulate a first nonfractional round reference frequency value carrier wave with a low frequency signal current containing the information to be transmitted, first transmitter filtering means to remove the carrier and extract a relaively narrow band from one side-band where one of the extremities thereof borders on the carrier, second transmitter filtering means to remove the carrier and extract the other relatively wide side-band containing the information signal and situated on the other side of the carrier in relation to the said narrow band, means connected to said first transmitter filtering means to transpose the said narrow band to the other side of the limit of the said wide side-band, means for summing said wide side-band and said narrow transposed band, and output means for effecting at least one transposition to a higher frequency in the spectrum of the signal formed by the sum of the said wide side-band and the said narrow transposed band to generate a transmission signal, the single-side-band communication system further comprising a receiver of the single-side-band type for receiving said transmission signal, the receiver comprising first receiver demodulation means to transpose the received transmission signal spectrum to a lower frequency, second receiver demodulation means for demodulating the lower frequency signal spectrum with a first carrier to obtain a composite lower frequency spectrum containing the said wide side-band and narrow band on one side of the said reference carrier frequency, first receiver filter means to extract the said narrow auxiliary band bordering on the reference carrier from the composite lower frequency spectrum appearing at the output of the second receiver demodulation means, the said narrow auxiliary band being transposed to a frequency range entirely comprised inside a band symmetrical to the wide band with respect to the reference carrier frequency, third receiver demodulation means for transposing the extracted narrow auxiliary band to the other side of the reference carrier frequency from said wide band with a second low frequency carrier, additional receiver filter means for extracting the transposed narrow auxiliary band, second receiver filter means for extracting the said wide band limited by the said round value reference carrier frequency from the said composite spectrum, third receiver filter means to extract from said wide band a narrow supplementary band symmetrical to the said transposed narrow auxiliary band in relation to the said reference carrier frequency, fourth receiver demoduation means to demodulate the said transposed narrow auxiliary band with the said supplementary band, fourth receiver filtering means to extract a frequency double the value of the said reference carrier frequency from the output of the fourth receiver demodulation means, division means coupled to the output of the fourth receiver filtering means to extract the said reference carrier, and receiver output demodulation means to obtain the low frequency information signal comprising means coupled to the output of the second receiver filter means to demodulate the said wide band containing the information signal with the said reference carrier derived by the division means followed by additional filtering means.

6. A single-side-band communication system as defined in claim 5 wherein said means to transpose said narrow band comprises second modulation means to modulate the said narrow band by an auxiliary carrier followed by additional filter means extracting only one side-band of the resulting modulated signal and summing means for summing said wide band derived from said second filter means and said narrow band derived from said additional filter means.

7. A transmitter of the single-side-band type comprising a first signal source providing a low frequency signal containing information to be transmitted, a second signal source providing a first non-fractional round frequency value carrier signal, a first modulator connected to said first and second signal sources for modulating said carrier signal with said low frequency signal producing a modulated signal comprising a carrier and respective upper and lower side-bands, a first filter connected to the output of said first modulator having a band-pass including only a relatively narrow band of one of said upper and lower side-bands, said narrow band being located adjacent the carrier of said modulated signal, a second filter connected to the output of said first modulator having a band-pass including only the other side-band of said modulated signal, a second modulator connected to the output of said first filter and to a third signal source for modulating said narrow band with a carrier signal from said third signal source, a third filter connected to the output of said second modulator having a band-pass including only one side-band of the signal derived from said second modulator, a summing amplifier connected to the outputs of said second and third filters for summing the signals derived therefrom, and output means for effecting at least one transposition to a higher frequency in the spectrum of the signal obtained at the output of said summing amplifier.

References Cited

UNITED STATES PATENTS

| | | | |
|---|---|---|---|
| 1,527,228 | 2/1925 | Schelleng | 325—329 |
| 2,110,046 | 3/1938 | Koomans | 325—136 |
| 2,273,023 | 2/1942 | Bellescize | 325—50 |
| 2,276,863 | 3/1942 | Peterson | 325—329 |
| 2,389,356 | 11/1945 | Goldstine | 325—59 X |
| 2,835,889 | 5/1958 | Dyer et al. | 343—200 |

ROBERT L. GRIFFIN, Primary Examiner

B. V. SAFOUREK, Assistant Examiner

U.S. Cl. X.R.

325—50, 136, 138, 329, 331